US006169723B1

United States Patent
Fertner et al.

(10) Patent No.: US 6,169,723 B1
(45) Date of Patent: Jan. 2, 2001

(54) COMPUTATIONALLY EFFICIENT ANALYSIS AND SYNTHESIS OF REAL SIGNALS USING DISCRETE FOURIER TRANSFORMS AND INVERSE DISCRETE FOURIER TRANSFORMS

(75) Inventors: Antoni Fertner, Solna; Mattias Hyll; Anders Örling, both of Stockholm, all of (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 08/990,741

(22) Filed: Dec. 15, 1997

Related U.S. Application Data

(63) Continuation-in-part of application No. 08/887,467, filed on Jul. 2, 1997, now Pat. No. 5,987,005.

(51) Int. Cl.⁷ .................................................. G01R 23/16

(52) U.S. Cl. .................... 370/210; 370/480; 375/222; 324/76.21

(58) Field of Search ....................... 370/210, 295, 370/419, 420, 430, 485, 480; 208/320, 321, 404, 405; 375/231, 279, 27, 76, 21, 350; 704/256; 324/309, 77; 364/724.18

(56) References Cited

U.S. PATENT DOCUMENTS

| | | | |
|---|---|---|---|
| 3,803,391 | 4/1974 | Vernet | 708/405 |
| 4,051,357 | 9/1977 | Bonnerot | 708/404 |
| 4,117,541 | * 9/1978 | Ali | 708/320 |
| 4,164,021 | * 8/1979 | Nishitani et al. | 708/405 |
| 5,285,474 | * 2/1994 | Chow et al. | 375/231 |
| 5,297,070 | * 3/1994 | Hua et al. | 708/404 |
| 5,323,391 | * 6/1994 | Harrison | 370/210 |
| 5,502,747 | * 3/1996 | McGrath | 375/350 |
| 5,671,168 | * 9/1997 | Liu et al. | 708/321 |
| 5,862,182 | * 1/1999 | Awater et al. | 375/279 |
| 6,026,359 | * 2/2000 | Yamaguchi et al. | 704/256 |

FOREIGN PATENT DOCUMENTS

| | | |
|---|---|---|
| 08163074 | 6/1996 | (JP) . |
| 95/28773 A | 10/1995 | (WO) . |

OTHER PUBLICATIONS

Melander, Widhe, and Wanhammar, "Design of a 128–point FFT processor for OFDM applications", ICECS, pp. 828–831, Jan. 1996.

Cioffi, Kasturia, and Ruiz, "Discrete Multiple Tone Modulation with Coset Coding for the Spectrally Shaped Channel", IEEE Transactions and Communications, vol. 40 pp. 1012–1029, Jun. 1992.

(List continued on next page.)

*Primary Examiner*—Hassan Kizou
*Assistant Examiner*—John Pezzlo
(74) *Attorney, Agent, or Firm*—Nixon & Vanderhye P.C.

(57) ABSTRACT

The present invention significantly reduces the number of complex computations that must be performed to compute a DFT or IDFT when a pattern is identified in an original input data sequence and is used to modify the data sequence in order to reduce the size of the sequence to be transformed. A DFT (IDFT) is performed on the modified input data sequence to generate a transformed sequence. The transformed data sequence is then manipulated to generate an output sequence that corresponds to the DFT (IDFT) of the original input data sequence without having actually calculated the DFT (IDFT) of the entire, original input data sequence. Three symmetrical patterns are used in the invention to simplify and render more efficient DFT and IDFT computations: Hermite symmetry, index-reversed, complex-conjugate symmetry, and mirror symmetry. As a result, the number of complex multiplications required to perform the DFT (or IDFT) is considerably less than the number of complex multiplications required to calculate the DFT (or IDFT) of the original input data sequence. The computational reduction increases signal processing speed and decreases power consumption, both attributes are highly desirable in virtually every DFT/IDFT application.

44 Claims, 5 Drawing Sheets

OTHER PUBLICATIONS

Chen, Jianping et al., "An Efficient FFT Algorithm for Real–Symmetric Data", 1992 IEEE International Conference on Acoustics, Speech and Signal Processing, Digital Signal Processing 2, Estimation, VLSI, vol. 5, No. Conf. 17, Mar. 23–26, 1992, pp. V18–V20.

Torii, T., "On the Algorithm of Fast Fourier Transform Using Symmetry of Input Data", Journal of the Information Processing Society of Japan, vol. 15, No. 7, Jul. 1974, pp. 516–523.

Vetterli, M. "FFT's of Signals with Symmetries and Applications", Proceedings of MELECON '85, vol. II, Oct. 8–10, 1985, pp. 1–4.

*IEEE Transactions on Signal Processing*, vol. 43, No. 9, Sep. 1995, pp. 2193–2194, K.M. Lam et al., "Computing the Inverse DFT with the In–Place, In–Order Prime Factor FFT Algorithm".

"Digital Communications," J. Proakis, pp. 680–686–693, Chapter 12, "Multichannel and Multicarrier Systems," McGraw–Hill Series in Electrical and Computer Engineering, McGraw–Hill, Inc, 1995, ISBN 0–07–051726–6.

"Digital Signal Processing Algorithms and Applications," J.D. Proakis and D.G. Manolakis, $2^{nd}$ Ed., Macmillan, 1992, pp. 733–734.

Sharp Application Notes, Digial Signal Processing, LH9124, pp. 1A–3–1A–21, 1993.

*Communications of the ACM*, vol. 11, No. 10, Oct. 1968, pp. 703–710, J.F. Traub, "Numerical Analysis".

*IEEE Transactions on Acoustics, Speech, and Signal Processing*, vol. ASSP–30, No. 4, Aug. 1982, pp. 595–607, Robert D.Preuss, "Very Fast Computation of the Radix–2 Discrete Fourier Transform".

G.V. Zaitsev and N.E. Nagulin, "Class of Fast Fourier Transform Algorithms for a Real Sequence," 1983 Plenum Publishing Corporation, pp. 40–49.

*IEEE Journal of Solid–State Circuits*, vol. 30, No. 3, Mar. 1995, pp. 300–305, E. Bidet et al., "A Fast Single–Chip Implementation of 8192 Complex Point FFT".

Motorola, Inc., Digital Signal Processor Division, Austin, Texas, Wei Chen & Scott King, "Implementation of Real–Valued Imput FFT on Motorola DSPs," pp. 806–811.

*IEEE Transactions on Acoustics, Speech, and Signal Processing*, vol. ASSP–35, No. 6, Jun. 1987, pp. 849–863, Henrik V. Sorensen et al., "Real–Valued Fast Fourier Transform Algorithms".

*IEEE Transactions on Signal Processing*, vol. 41, No. 3, Mar. 1993, pp. 1184–1200, Henrik V. Sorensen et al., "Efficient Computation of the DFT with Only a Subset of Input or Output Points".

*IEEE*, 1992, pp. V–13–V16, Lu, "New Algorithms for the FFT Computation of Symmetric and Translational Complex Conjugate Sequences".

ANSI TI E1.4/97–137, Clearwater Beach, Florida, May 12–16, 1997, Mikael Isaksson et al, "Zipper –a duplex scheme proposal for VDSL based on DMT".

* cited by examiner

COMPUTATIONALLY EFFICIENT ANALYSIS AND SYNTHESIS OF REAL SIGNALS USING DISCRETE FOURIER TRANSFORMS AND INVERSE DISCRETE FOURIER TRANSFORMS

RELATED APPLICATIONS

This application is a continuation-in-part of commonly assigned U.S. patent application Ser. No. 08/887,467, entitled "Method and Apparatus for Efficient Computation of Discrete Fourier Transform (DFT) and Inverse Discrete Fourier Transform (IDFT)," filed on Jul. 2, 1997 now U.S. Pat. No. 5,987,005, the disclosure of which is incorporated herein by reference.

FIELD OF THE INVENTION

The present invention relates to the use of the discrete Fourier transform (DFT) and the inverse discrete Fourier transform (IDFT) in a wide variety of signal processing applications. In particular, the invention presents more efficient and less complex methods for computing the DFT and IDFT.

BACKGROUND AND SUMMARY OF THE INVENTION

Orthogonal transforms and transform properties are extraordinarily useful in solving new technological problems. Such transforms permit analysis of most signals given some knowledge of its constituent parts. The Fourier transform in particular has become a powerful tool in increasingly diverse fields including linear systems, communications systems, image processing applications, etc. to name just a few.

The discrete Fourier transform (DFT) is the counterpart of the Fourier transform in the discrete time domain. In general, the DFT may be defined as follows:

$$X_k = \sum_{n=0}^{N-1} x_n W_N^{kn} \quad k = 0, 1 \ldots, N-1 \qquad (1)$$

and the inverse DFT (IDFT) is expressed as:

$$x_n = 1/N \sum_{k=0}^{N-1} X_k W_N^{-kn} \quad k = 0, 1 \ldots, N-1 \qquad (2)$$

where $W_N^k = e^{-j2\pi k/N}$. In equations (1) and (2), $X_n$ is the sample value in the time domain, and $X_k$ is the sample value in the frequency domain.

Direct calculation of the DFT and the IDFT is computationally intensive and requires $N^2$ complex multiplications and $N(N-1)$ complex additions. Such computational overhead is quite burdensome in terms of reduced signal processing speed, increased power consumption, and higher expense. One important tool in modern digital signal processing applications that helps to reduce that overhead is the Fast Fourier Transform (FFT). The FFT computes the DFT by mapping an N-point complex sequence to its corresponding N-point complex frequency spectrum and vice versa for the IFFT and IDFT.

Although FFT algorithms are typically designed to compute the DFT of a complex sequence, in many applications, the sequence to be transformed is real valued. But even for real value sequence applications, the FFT/IFFT requires multiple complex multiplications and additions. Thus, there is an ongoing need to reduce the number of FFT/IFFT computations, and in particular the number of complex multiplications, that must be performed in order to more efficiently compute the FFT and the IFFT.

The present invention meets this need and significantly reduces the number of complex computations that must be performed in computing the DFT and IDFT of real value sequences. The computational reduction increases signal processing speed and decreases power consumption, both of which are highly desirable in virtually every DFT/IDFT application. The present invention achieves these goals by taking advantage of various symmetries and regularities of processed data sequences.

A pattern is identified in an original data sequence and is used to modify the data sequence in order to reduce the length of the FFT. A DFT (or IDFT) is then performed on the modified input data sequence to generate a transformed sequence. The transformed data sequence is then manipulated to generate an output sequence that corresponds to the DFT (or IDFT) of the original input data sequence without having to actually calculate the DFT (or IDFT) of the entire, original input data sequence. Moreover, the IDFT may then be determined using the complex-conjugate of the already-calculated DFT rather than independently calculating the IDFT (and vice versa).

The pattern in the original data sequence may include a particular symmetry. Three symmetrical patterns, corresponding to three example embodiments of the present invention, are used to simplify and render more efficient DFT and IDFT computations: Hermite symmetry, index-reversed complex-conjugate symmetry, and mirror symmetry. In the Hermite and mirror symmetry example embodiments, the modified data sequence is substantially shorter than the original data sequence, e.g., one-half the length of the original data sequence, one-fourth of the length of the original data sequence, etc. In all three embodiments, the number of complex multiplications required to perform the DFT (or IDFT) of the modified data sequence is considerably less than the number of complex multiplications required to calculate the DFT (or IDFT) of the original input data sequence.

In the Hermite symmetry example embodiment, an original, N-point input data sequence is efficiently transformed using either a DFT (or an IDFT). From the original, N-point Hermite symmetric input data sequence, an N/2 sequence of complex numbers is defined. A DFT (or an IDFT) is executed on the N/2 sequence to generate a transformed data sequence. The real part of the transformed sequence is output as the even numbered samples and the imaginary part as the odd numbered samples of the output sequence corresponding to the DFT (or the IDFT) of the original, N-point, Hermite symmetric input data sequence.

In the index-reversed, complex-conjugate symmetry example embodiment, first and second input data sequences are defined. A DFT (or IDFT) is executed on the first input data sequence to generate a transformed data sequence. The DFT (or IDFT) of the second input data sequence is then determined using the DFT (or IDFT) of the first input data sequence. In other words, the DFT (or IDFT) of the second input data sequence is determined without formally calculating the DFT (or IDFT) of the second input data sequence. This computational saving is achieved as a result of the first and second sequences being index-reversed, complex-conjugate sequences. More specifically, the DFT (or IDFT) of the second input data sequence is determined by complex-conjugating the DFT (or IDFT) of the first input data sequence and multiplying by a complex number.

The third example embodiment of the present invention takes advantage of mirror symmetric data sequences, i.e., a sequence of length N where the elements starting with index N/2 through N−1 are the complex-conjugate of the elements with index 0 through N/2−1 in reverse order. A mirror symmetric input data sequence is split into first and second sub-sequences. The first sub-sequence includes the even components of the mirror symmetric input data sequence, and the second sub-sequence includes the odd components of the mirror symmetric input data sequence. The DFT (or IDFT) is executed on the first sub-sequence to generate a transformed data sequence. A first half of the DFT (or IDFT) of the input data sequence is then determined using the DFT (or IDFT) of the first sub-sequence and adding its complex-conjugated sequence multiplied by a twiddle factor. The second remaining half of the DFT (or IDFT) of the input data sequence is determined using the DFT (or IDFT) of the first sub-sequence and subtracting its complex-conjugate sequence multiplied by a twiddle factor.

One practical application of the present invention is to digital modems where one information sequence to be transmitted is modulated onto discrete multi-tone (DMT) carriers using an inverse fast Fourier transform (IFFT) and the received sequence is demodulated by using a fast Fourier transform (FFT). A pre-transform processor modifies an original sequence based upon an identified pattern in that sequence to reduce the number of samples. Transform circuitry then performs an IFFT on the modified data sequence to modulate the DMT carriers to be transmitted in a transmit direction and an FFT to demodulate DMT carriers received in the receive direction. A transform processor manipulates the transformed data sequence to generate an output sequence corresponding to the FFT or the IFFT of the original data sequence. In one example embodiment of a DMT system, even numbered DMT carriers are employed in the transmit direction and odd numbered DMT carriers are employed in the receive direction. The number of DMT carriers in both directions can be substantially the same (symmetric communication), or substantially different (asymmetric communication).

While the primary object of the present invention is to provide efficient DFT/IDFT computational procedures, other objects and advantages of the present invention will become apparent to those skilled in the art as described below in further detail in conjunction with the figures and the pending claims.

DETAILED DESCRIPTION OF THE DRAWINGS

DETAILED DESCRIPTION OF INVENTION

In the following description, for purposes of explanation and not limitation, specific details are set forth, such as particular modulation/demodulation techniques, applications, protocols, etc. in order to provide a thorough understanding of the present invention. However, it will be apparent to one skilled in the art that the present invention may be practiced in other embodiments that depart from these specific details. In other instances, detailed descriptions of well-known methods, protocols, devices, and circuits are omitted so as not to obscure the description of the present invention with unnecessary detail.

General Embodiments

The present invention will be described in the context of several general example embodiments and then applied as an example to a discrete multi-tone modulation (DMT) digital communications system that conforms to a particular communications protocol. While the following explanation and the invention apply fully to both time and frequency domains, the descriptive examples are generally provided in only one domain for purposes of illustration.

Figure 1:
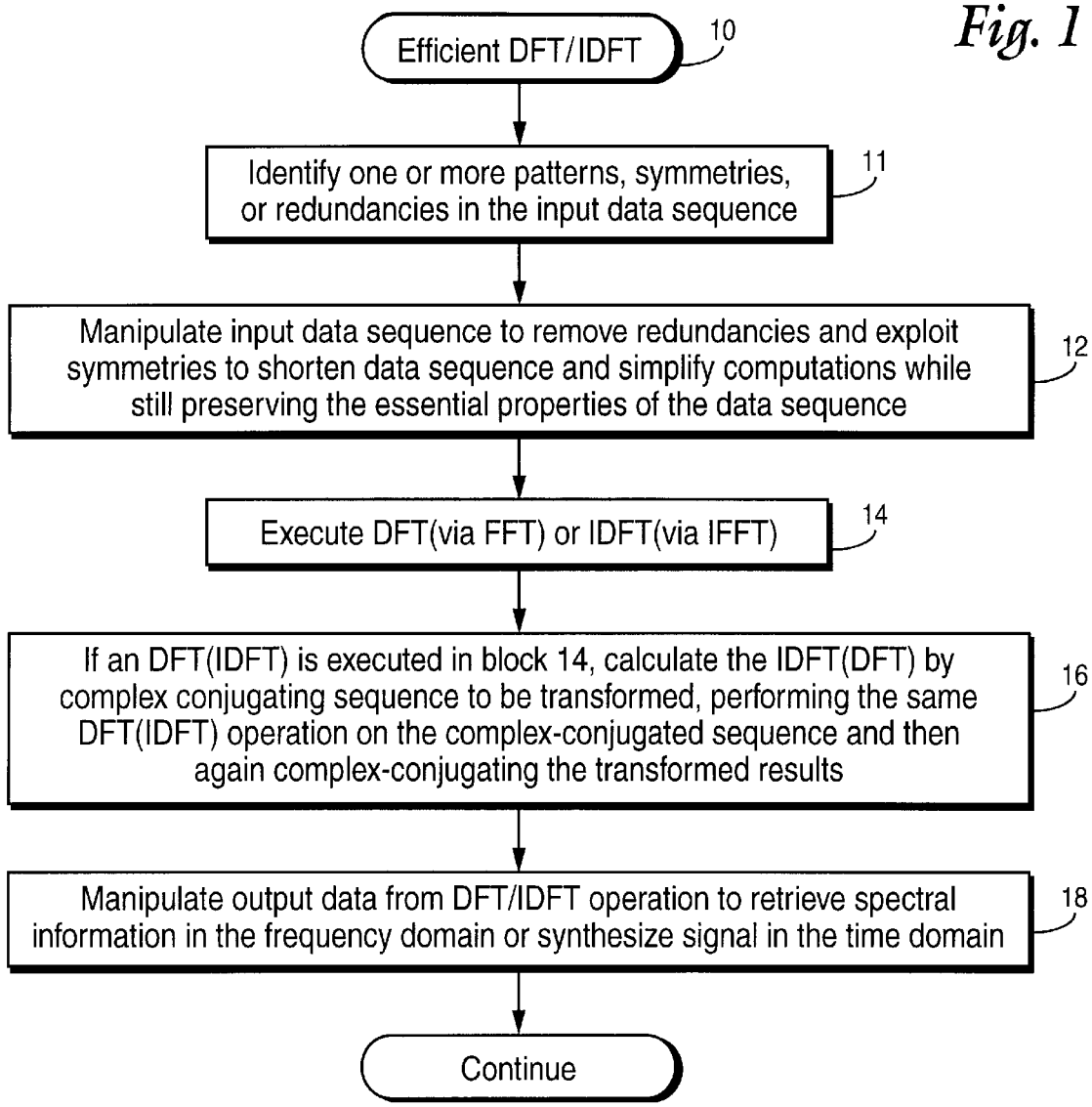
FIG. 1 is a flowchart diagram illustrating efficient DFT/IDFT transformation procedures in accordance with a general embodiment of the present invention.

FIG. 1 is a flowchart diagram which illustrates the general procedures for efficiently performing DFT/IDFT operations (block 10) in accordance with the present invention. First, the input data to be transformed is analyzed to identify one or more patterns, symmetries, or redundancies (block 11). The input data is then manipulated to remove redundancies or exploit symmetries to shorten or otherwise simplify the input data sequence to be transformed (block 12). Advantageously, the manipulation of the input data sequence is performed such a way so as to preserve the essential properties of the input data sequence. A DFT or IDFT is then performed on the manipulated input data sequence using the well-known fast Fourier transform or inverse fast Fourier transform, respectively (block 14).

Having already performed a transform, that same DFT operation can be "reused" to perform the IDFT as shown in block 14. In particular, the same piece of hardware or the same software algorithm used to implement the DFT can be used to also implement the IDFT using only relatively minor operations to pre-process and post-process the data. The pre-processing includes complex conjugating the input data sequence upon which the IDFT is to be performed. The DFT operation is then performed on that complex-conjugated sequence. The post-processing includes complex conjugating the transformed results. A more detailed description of the operations included in block 16 is set forth in the above-identified parent application, the disclosure of which is incorporated herein by reference. Alternatively, if the IDFT is executed in block 14, the DFT may be calculated using the same IDFT operation (e.g., hardware or software algorithm) as long as the input sequence is complex-conjugated before transformation and the transformed output sequence is then complex-conjugated.

In any event, the transformed output data sequence is manipulated to retrieve spectral information in the frequency domain or synthesize a signal sequence in the time domain (block 18). These procedures significantly reduce the complexity of the DFT/IDFT operations thereby increasing the signal processing speed without a loss of information or computational accuracy. Moreover, if the procedures outlined in block 16 are implemented, additional efficiency is achieved because the same hardware and/or software resources are essentially used to perform both the DFT and IDFT operations.

Three example embodiments of the invention use corresponding symmetries to simplify DFT/IDFT computations: Hermite symmetry, index-reversed complex-conjugate symmetry, and mirror symmetry. Each example embodiment is described in turn.

1. Hermite Symmetry

A first example embodiment of the invention provides efficient or simplified DFT/IDFT computations by taking advantage of Hermite symmetry. In the formal definition of the DFT/IDFT, both $x_n$ and $X_k$ are assumed to be complex. But if one of these sequences is real-valued, then half of the numbers corresponding to the imaginary parts are zero. Accordingly, DFT computations for real valued sequences are based on the fact that real value sequences in one domain exhibit Hermite symmetry in the other domain. An example of an eight point, Hermite symmetric sequence, (i.e., the number of samples or data points N in the sequence is 8), is $$X_k = 0, 1+i, 2-i, 3+i, 4, 3-i, 2+i, 1-i \quad k \ldots 0 \ldots 1 \ldots 2 \ldots 3 \ldots 4 \ldots 5 \ldots 6 \ldots 7 \quad (3)$$

Formally, Hermite symmetry may be described as follows:

$$X_{\frac{N}{2}+m} = X^*_{\frac{N}{2}-m} \qquad (4)$$

Observe that for m=0, it follows that $X_{N/2}=X^*_{N/2}$ therefore $X_{N/2}$ is real.
For m=n/2, it similarly follows that $X_N=X^*_0=X^*_N$ therefore $X_0$ is real.

If $X_k$ is an N-point Hermite symmetric series, the Fourier transformation of $X_k$ is a real sequence, $x_n$. Regarding subscripts, the index for frequency sequences is k, sequences in the time domain (lower case) are indexed by n, and index m is a general substitution index that can be used for both time and frequency sequences.

We construct a new complex sequence $v_m$ using the real sequence $x_n$ $$v_m = x_{2m} + j \cdot x_{2m+1} \qquad (5)$$

for an index m=0, 1, . . . , N/2−1 which is only half as long (i.e.,N/2 complex points) as the N-point, original, real series, $x_n$. Therefore, computation of the complex series $v_m$ requires only an N/2-point IDFT which reduces the number of arithmetical operations roughly by factor of two.

In more detail, the real part of $v_m$ may be expressed by $$\text{real}(v_m) = x_{2m} = \frac{1}{N}\sum_{k=0}^{N-1} X_k \cdot W_N^{-k2m} = \frac{1}{N}\sum_{k=0}^{N-1} X_k \cdot W_{N/2}^{-mk} \qquad (6)$$

Splitting the sum above into two sums yields $$x_{2m} = \frac{1}{N}\left\{\sum_{k=0}^{\frac{N}{2}-1} X_k \cdot W_{N/2}^{-mk} + \sum_{k=\frac{N}{2}}^{N-1} X_k \cdot W_{N/2}^{-mk}\right\} \qquad (7)$$

-continued $$= \frac{1}{N}\left\{\sum_{k=0}^{\frac{N}{2}-1} X_k \cdot W_{N/2}^{-mk} + \sum_{k=0}^{\frac{N}{2}-1} X_{\frac{N}{2}+k} \cdot W_{N/2}^{-(\frac{N}{2}+k)m}\right\}$$

Using the formal definition if Hermite symmetry from equation (4) repeated below $$X_{\frac{N}{2}+k} = X^*_{\frac{N}{2}-k} \qquad (8)$$

the following expression may be obtained:

$$\text{real}(v_m) = x_{2m} = \frac{1}{N}\sum_{k=0}^{\frac{N}{2}-1} \left(X_k + X^*_{\frac{N}{2}-k}\right) \cdot W_{N/2}^{-mk} \qquad (9)$$

Similarly, the imaginary part of $v_m$ may be expressed as $$\text{imag}(v_m) = x_{2m+1} = \frac{1}{N}\sum_{k=0}^{N-1} X_k \cdot W_N^{-k(2m+1)} \qquad (10)$$

Again, splitting the sum above into two sums yields $$x_{2m+1} = \frac{1}{N}\left\{\sum_{k=0}^{\frac{N}{2}-1} X_k \cdot W_N^{-k} \cdot W_{N/2}^{-mk} + \sum_{k=0}^{\frac{N}{2}-1} X_{\frac{N}{2}+k} \cdot W_N^{-(\frac{N}{2}+k)(2m+1)}\right\} \qquad (11)$$

The following congruence relation may be used to simplify equation (11):

$$W_N^{-(\frac{N}{2}+k)(2m+1)} = -W_N^{-k} \cdot W_{N/2}^{-mk} \qquad (12)$$

Inserting equation (8) into equation (11) and applying equation (12) results in $$\text{imag}(v_m) = x_{2m+1} = \frac{1}{N}\sum_{k=0}^{\frac{N}{2}-1} \left\{\left(X_k - X^*_{\frac{N}{2}-k}\right) \cdot W_N^{-k}\right\} \cdot W_{N/2}^{-mk} \qquad (13)$$

Consequently, $v_m$ may be expressed as the IDFT of half the sequence, $X_k$, i.e., $$v_m = \frac{1}{N}\sum_{k=0}^{\frac{N}{2}-1}\left\{\left(X_k + X^*_{\frac{N}{2}-k}\right) + j\left(X_k - X^*_{\frac{N}{2}-k}\right) \cdot W_N^{-k}\right\} \cdot W_{N/2}^{-mk} \qquad (14)$$

Hence, the sequence $v_m$ defined by equation (5), $v_m = v_{2m} + j \cdot x_{2m+1}$, may be obtained by taking a Fourier transform of just one-half of the original sequence $$\tilde{X}_k = \left(X_k + X^*_{\frac{N}{2}-k}\right) + j\left(X_k - X^*_{\frac{N}{2}-k}\right) \cdot W_N^{-k} \qquad (15)$$

The real part of series $v_m$ corresponds to the evenly-numbered samples, and the imaginary part of series $v_m$ corresponds to the odd-numbered samples of the desired real series $x_n$.

Thus, applying the steps of FIG. 1 to the Hermite symmetry example embodiment, the original input data sequence is manipulated in order to form a modified input data sequence defined by equation (15) that is just one-half of the size of the original input data sequence. Accordingly, the IDFT is executed (using the IFFT) on a much smaller size data sequence thereby considerably reducing the number of IFFT mathematical computations that must be performed. The output data generated by the Fourier transform calculated in accordance with equation (15) is then manipulated to generate an output sequence corresponding to the IDFT of the original input data sequence. Specifically, the real parts of the transformed sequence are assigned as the even numbered samples and the imaginary parts as the odd samples.

This considerable reduction in the size of the input sequence to be transformed is achieved at the relatively small expense of N/2 complex multiplications and 3/2N additions as indicated in equation (14). Accordingly, this Hermite symmetry example embodiment of the invention only required $$\frac{N}{4} \cdot \log_2\left(\frac{N}{2}\right) + \frac{N}{2} = \frac{N}{4} \cdot \log_2(2N)$$

complex multiplications and $$\frac{N}{2} \cdot \log_2\left(\frac{N}{2}\right) + \frac{3}{2} \cdot N = \frac{N}{2} \cdot \log_2(4N)$$

additions as compared to the $N2 \cdot \log_2(N)$ complex multiplications and $N \cdot \log_2(N)$ additions typically required by each DFT/IDFT. The number of operations saved increases significantly as the value of N increases.

Figure 2:
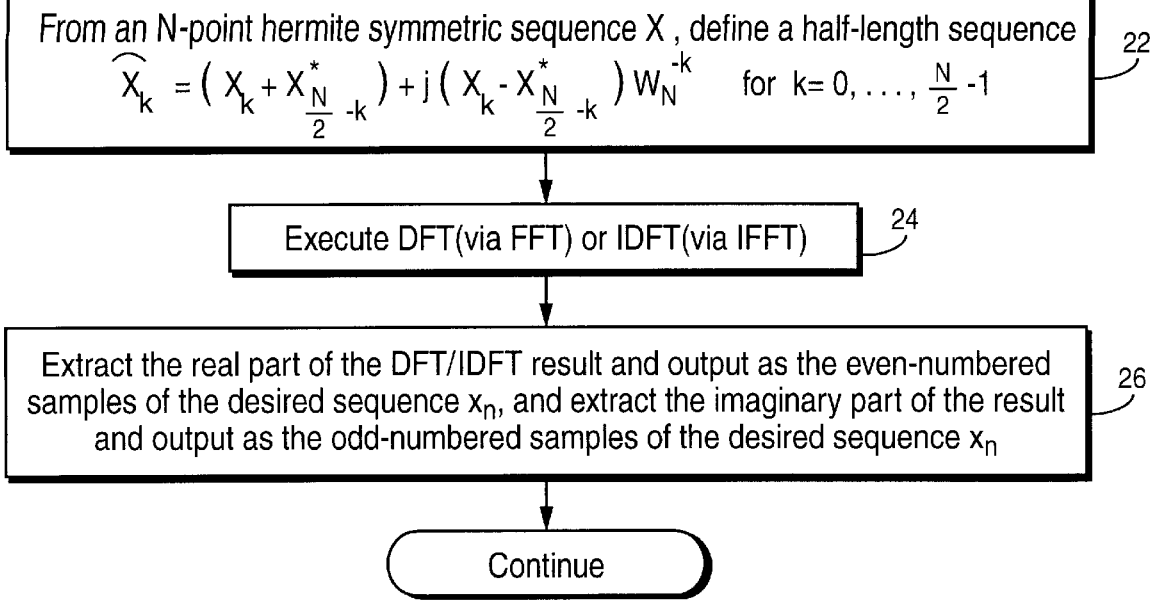
FIG. 2 is a flowchart diagram illustrating one example embodiment of the present invention pertaining to a Hermite symmetric input sequence.
Figure 3:
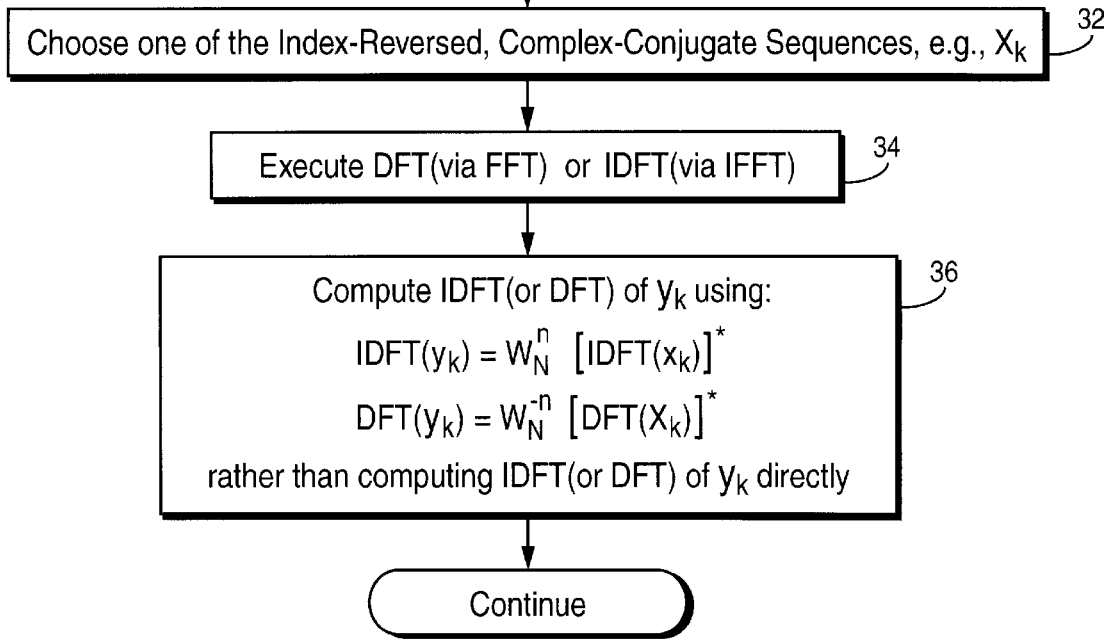
FIG. 3 is a flowchart diagram illustrating one example embodiment of the present invention pertaining to an index-reversed conjugate input sequence.

FIG. 2 illustrates procedures in flowchart format in accordance with the present invention for determining the DFT/IDFT of a Hermite symmetric sequence (block 20). From an N-point Hermite symmetric series $X_k$, a half-length series (i.e., N/2-points) is defined $$\hat{X}_k = \left(X_k + X^*_{\frac{N}{2}-k}\right) + j\left(X_k - X^*_{\frac{N}{2}-k}\right)W_N^{-k} \quad (15)$$

for $k=0 \ldots, N/2-1$. The DFT or IDFT is then executed using the FFT or IFFT, respectively, on the half-length series $\hat{X}_k$ (block 24). The real part of the DFT/IDFT result is extracted and output as the even-numbered samples of the desired series $x_n$. The imaginary part of the DFT/IDFT result is similarly extracted but output as the odd-numbered samples of the desired series $x_n$ (block 26). Thus, in this embodiment, the output manipulation is the extraction process where the real and imaginary parts are assigned to even and odd numbered samples, respectively.

2. Index-Reversed, Complex-Conjugate Symmetry

A second example embodiment of the present invention provides efficient DFT/IDFT computation by taking advantage of index-reversed, complex-conjugate symmetry. Unlike Hermite symmetry which 5 may exist within a single input data sequence, index-reversed conjugate symmetry may exist between two data sequences. The following is a simple example of two index-reversed complex-conjugate sequences $X_k$ and $Y_k$:

$$X_k=1+i,2-i,3+i,4-i \quad k=0, \ldots, 3 \quad (16)$$

$$Y_k=4+i,3-i,2+i,1-i \quad k=0, \ldots, 3 \quad (17)$$

In this example, the first element of series $X_k$ is the complex-conjugate of the last element of series $Y_k$, the second element of series $X_k$ is the complex-conjugate of the second to last element of series $Y_k$, etc.

More formally, two sequences are index-reversed, complex-conjugates if the following property exists:

$$X_k=Y^*_{N-1-k} \quad (18)$$

$$x_n=y^*_{N-1-m} \quad (19)$$

where $X_k$ and $Y_k$ are complex sequences in the frequency domain, $x_n$ and $y_n$ are complex sequences in the time domain, and N is the number of data points in each sequence. In the above example, N equals 4.

In conventional DFT/IDFT algorithms, the Fourier transforms and inverse Fourier transforms of both the $X_k$ and $Y_k$ sequences must be calculated. However, in the case of index-reversed, complex-conjugated series, the transform of series $X_k$ may also be used directly in determining the transform of series $Y_k$ with considerably less computational effort than independently and separately computing the transform of $Y_k$.

More formally, let us perform an IDFT of the sequence $X_k$:

$$x_n = \frac{1}{N} \cdot \sum_{k=0}^{N-1} X_k \cdot W_N^{-kn} \quad (20)$$

According to the property expressed by equation (18), we can substitute $X_k=Y^*_{N-1-k}$ which gives:

$$x_n = \frac{1}{N} \cdot \sum_{k=0}^{N-1} Y^*_{N-1-k} \cdot W_N^{-kn} \quad (21)$$

If we change summation index from k to m=N−1−k, we can rewrite equation (21) as follows:

$$x_n = \frac{1}{N} \cdot \sum_{m=0}^{N-1} Y^*_m \cdot W_N^{-(N-1-m)n} = \frac{1}{N} \cdot W_N^n \cdot \sum_{m=0}^{N-1} Y^*_m \cdot W_N^{mn} \quad (22)$$

is Notably, observe that the expression $$\sum_{m=0}^{N-1} Y^*_m \cdot W_N^{mn}$$

is the DFT of the sequence $Y^*_m$.

Using a general property of complex numbers, the IDFT may be expressed in terms of the DFT for an arbitrary sequence Y of length N:

$$IDFT(Y_k)=1/N \cdot [DFT(Y^*_k)]^* \quad (23)$$

In other words, the sequence $Y_k$ may be first complex-conjugated, transformed using the DFT, then again complex-conjugated, and scaled to compute the IDFT of $Y_k$. Combining equations (20), (21), and (22) with property of equation (23) yields $$x_n=IDFT(X_k)=W_N^n \cdot [IDFT(Y_k)]^* \quad (24)$$

Accordingly, once the IDFT of sequence $X_k$ is calculated, it may also be used to determine the IDFT of sequence $Y_k$ with very little additional computational effort as is evident from equation (25).

$$IDFT(Y_k)=W_N^n \cdot [IDFT(X_k)]^* \quad (25)$$

Hence, the IDFT of an index-reversed, complex-conjugated sequence (e.g., $Y_k$) is efficiently obtained simply by multiplying the complex-conjugate (*) of the IDFT of the original sequence $X_k$ by a complex phase factor $W_N^n$.

Computing the second Fourier transform of an index-reversed, complex-conjugated sequence in accordance with the present invention does not require $N/2 \cdot \log_2(N)$ complex multiplications but instead only N complex multiplications and N additions. Beginning with N=4, therefore, the number of arithmetical operations is reduced using the present invention. For large values of N, quite a large number of computations may be eliminated This property may be advantageously exploited for instance at different stages of divide-and-conquer type FFT/IFFT algorithms.

A general procedure for taking a DFT or IDFT for index-reversed, complex-conjugate sequence $X_k$ and $Y_k$ is now described in accordance with flowchart procedures beginning at block 30. Initially, one of the index-reversed, complex-conjugate sequences, e.g., $X_k$ is chosen (block 32). The DFT (via the FFT) or IDFT (via the IFFT) is executed to transform the sequence $X_k$ (block 34). The IDFT or DFT of the index-reversed, complex-conjugate sequence $Y_k$ is then computed in a much simplified manner using the following:

$$DFT(y_n) = W_N^{-n} [DFT(x_n)]^* \text{ or} \tag{26}$$

$$IDFT(Y_k) = W_N^n [IDFT(X_k)]^* \tag{27}$$

rather than computing the IDFT (or DFT) of the sequence $Y_k$ directly (block 36). Equation (26) is derived in a similar manner as that for equation (25) (equation (25) is repeated here as equation (27) for convenience), starting with the DFT instead of the IDFT in equation (25).

3. Mirror Symmetry

A third example embodiment of the invention provides efficient or simplified DFT/IDFT computations by taking advantage of mirror symmetry. A single "mirror-symmetric" sequence consists of two index-reversed, complex-conjugate sequences following one another. An example of a mirror-symmetric sequence is as follows:

$$X_k = 1+i, 2-i, 3+i, 4-i, 4+i, 3-i, 2+i, 1-i \quad k=0, \ldots, 7 \tag{28}$$

Formally, a mirror-symmetric sequence is defined as follows:

$$X_k = X^*_{N-1-k} \tag{29}$$

where k=0, . . . , N−1. Again, although the complex series is defined in the frequency domain, $X_k$, the properties described are valid for a complex series in time domain $x_n$ as long as the same condition is fulfilled, i.e., $x_n = x^*_{N-1-n}$. The IDFT of a mirror-symmetric sequence $X_k$ is by definition $$x_n = \frac{1}{N} \sum_{k=0}^{N-1} X_k \cdot W_N^{-kn} \tag{30}$$

Splitting the sequence N in the summation in equation (30) into two sub-sequences N/2 of even and odd numbered components yields the IDFT of $X_k$ as:

$$x_n = \frac{1}{N} \left\{ \sum_{m=0}^{\frac{N}{2}-1} X_{2m} \cdot W_N^{-2mn} + \sum_{m=0}^{\frac{N}{2}-1} X_{2m+1} \cdot W_N^{-(2m+1)n} \right\} \tag{31}$$

$$= \frac{1}{N} \left\{ \sum_{m=0}^{\frac{N}{2}-1} X_{2m} \cdot W_{N/2}^{-mn} + W_N^{-n} \cdot \sum_{m=0}^{\frac{N}{2}-1} X_{2m+1} \cdot W_{N/2}^{-mn} \right\}$$

From equation (29), it follows that $$X_{2m+1} = X^*_{N-1-(2m+1)} = X^*_{N-2-2m} = X^*_{2(\frac{N}{2}-1-m)} \tag{32}$$

Accordingly, in the mirror-symmetric sequence $X_k$, the even-numbered component sequence $X_{2m}$ and the odd-numbered component sequence $X_{2m+1}$ are index-reversed conjugates For instance, the example sequence in equation (24) has even numbered components:

$$X_{2m} = 1+i, 3+i, 4+i, 2+i$$

and odd numbered components:

$$X_{2m}+1 = 2-i, 4-i, 3-i, 1-i$$

Applying the property set forth above for index-reversed conjugate sequences equation (25), we get the following expression for the IDFT:

$$x_n = \frac{1}{N} \left\{ \sum_{m=0}^{\frac{N}{2}-1} X_{2m} \cdot W_{N/2}^{-mn} + W_N^{-n} \cdot W_{N/2}^n \cdot \left[ \sum_{m=0}^{\frac{N}{2}-1} X_{2m} \cdot W_{N/2}^{-mn} \right]^* \right\} \tag{33}$$

$$= \frac{1}{N} \left\{ \sum_{m=0}^{\frac{N}{2}-1} X_{2m} \cdot W_{N/2}^{-mn} + W_N^n \cdot \left[ \sum_{m=0}^{\frac{N}{2}-1} X_{2m} \cdot W_{N/2}^{-mn} \right]^* \right\}$$

where $W_N^{-n} \cdot W_{N/2}^n = W_N^n$.

Substituting the term "IDFT" for the mathematical IDFT expression in equation (33), samples in the interval defined by n=0, . . . , N/2−1 are calculated using:

$$x_n = IDFT(X_{2m}) + W_N^n [IDFT(X_{2m})]^* \tag{34}$$

The second term in the brackets of equation (33) is the complex-conjugate of the first term because of the properties of the index-reversed, complex-conjugate symmetric series discussed earlier. Samples in the interval defined by n=N/2, . . . , N−1 are obtained by executing $$x_n = IDFT(X_{2m}) - W_N^n [IDFT(X_{2m})]^* \tag{35}$$

Thus, in the mirror-symmetry embodiment of the invention, instead of computing an N-point Fourier transform which requires $N/2 \cdot \log_2(N)$ complex multiplications and $N \cdot \log_2(N)$ additions, only one N/2-point Fourier transform plus an N/2 complex multiplications and N-additions are computed. Hence, the total number of calculations $$\frac{N}{4} \cdot \log_2\left(\frac{N}{2}\right) + \frac{N}{2} = \frac{N}{4} \cdot \log_2(2N)$$

is less than that for conventional DFT/IDFT computational methods for values of N greater than 2. More specifically, the number of the complex additions is reduced to $$\frac{N}{2} \cdot \log_2\left(\frac{N}{2}\right) + N = \frac{N}{2} \cdot \log_2(2N),$$

i.e., about halved.

Figure 4:
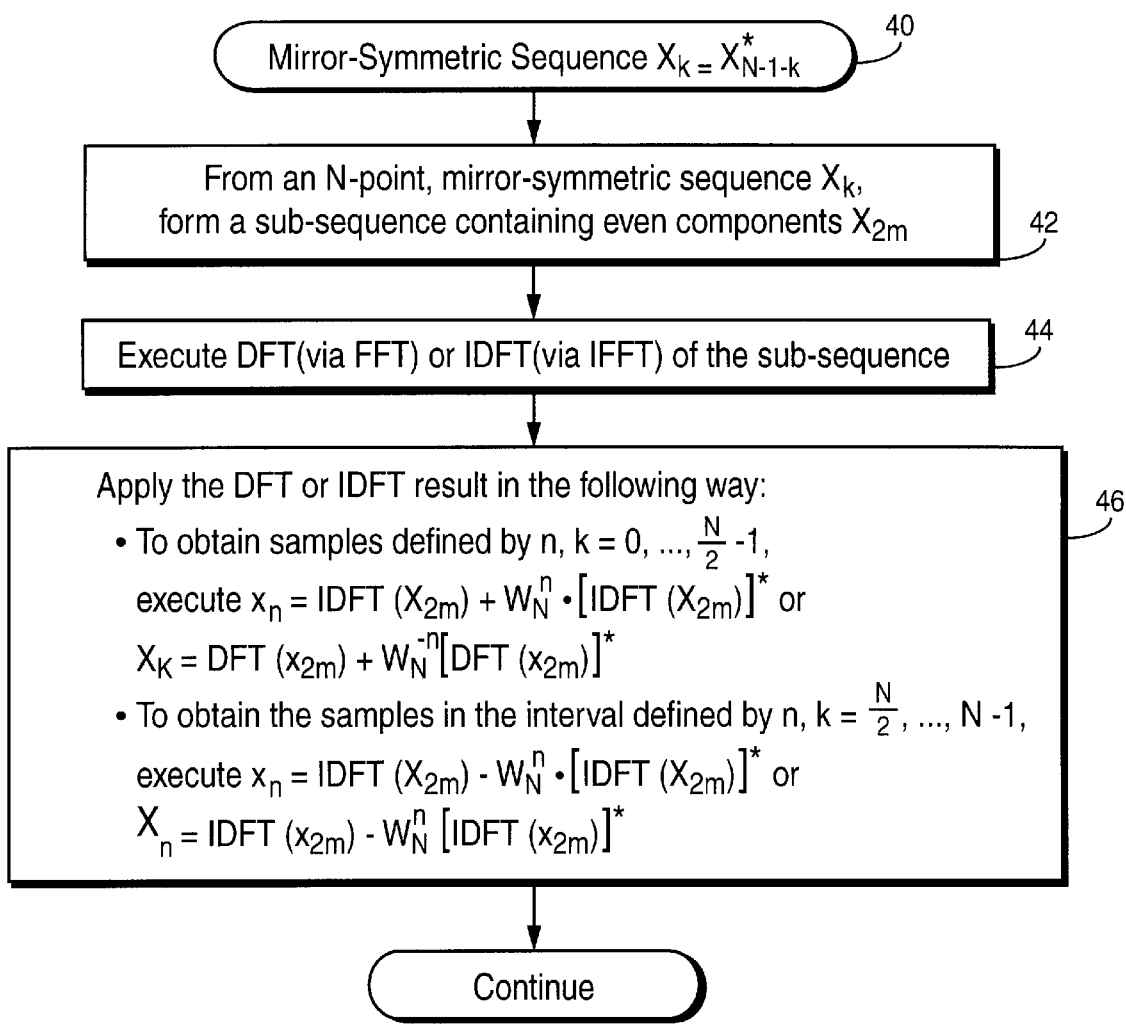
FIG. 4 is a flowchart diagram illustrating another example embodiment of the present invention pertaining to a mirror-symmetric input sequence.

FIG. 4 illustrates procedures in accordance with the present invention for determining the DFT/IDFT of a mirror-symmetric sequence $X_k = X^*_{N-1-k}$ (block 40). From an N-point mirror-symmetric sequence $X_k$, a sub-sequence $X_{2m}$ is formed that contains the even components of $X_k$ (block 42). The DFT or IDFT of the sub-sequence is then executed (block 44). Rather than computing the DFT (or IDFT) of the odd-component sub-sequence directly, the DFT (or IDFT) is calculated in a much simplified manner using the following relationships corresponding to equations (26) and (27) above:

$$DFT(y_n) = W_N^{-n}[DFT(x_n)]^*$$

or $$IDFT(Y_k) = W_N^{n}[IDFT(X_k)]^*$$

The result obtained in block 44 for the sub-sequence is applied in the following way. To obtain samples in the interval defined by n, k=0, ..., N/2−1, execute $x_n$=IDFT$(X_{2m})$+$W_N^{n}$[IDFT$(X_{2m})$]* or $X_k$=DFT$(x_{2m})$+$W_N^{-n}$[DFT$(x_{2m})$]*. To obtain samples for the interval n, k=N/2, ..., N−1 execute $x_n$=IDFT$(X_{2m})$−$W_N^{n}$[IDFT$(X_{2m})$]* or $X_k$=DFT$(X_{2m})$−$W_N^{-n}$[DFT$(x_{2m})$]*(block 46).

Digital Communication Example Applications of the Invention

The principles set forth in the generic embodiments disclosed above may be illustrated in a real world application to discrete multi-tone (DMT) modulation and demodulation used in a digital communications system. In particular, the present invention may be advantageously employed in Very high speed Digital Subscriber Links (VDSLs) where digital information is communicated using an Orthogonal Frequency Divided Duplex (OFDD) scheme based on an evolving DMT-type protocol named "Zipper."

1. Discrete Multi-Tone (DMT) Modulation/Demodulation

The general DMT principle of transmitting data by dividing it into several interleaved bit streams, and using these bit streams to modulate several carriers is well known. In a Discrete Multitone system, the input bit stream is first serial-to-parallel converted. The parallel output is then grouped into N groups of bits corresponding to the number of bits per symbol. Portions of bits are allocated to each DMT carrier or subchannel. The power transmitted over each subchannel corresponds to the number of bits transmitted over each DMT subchannel.

Figure 5:
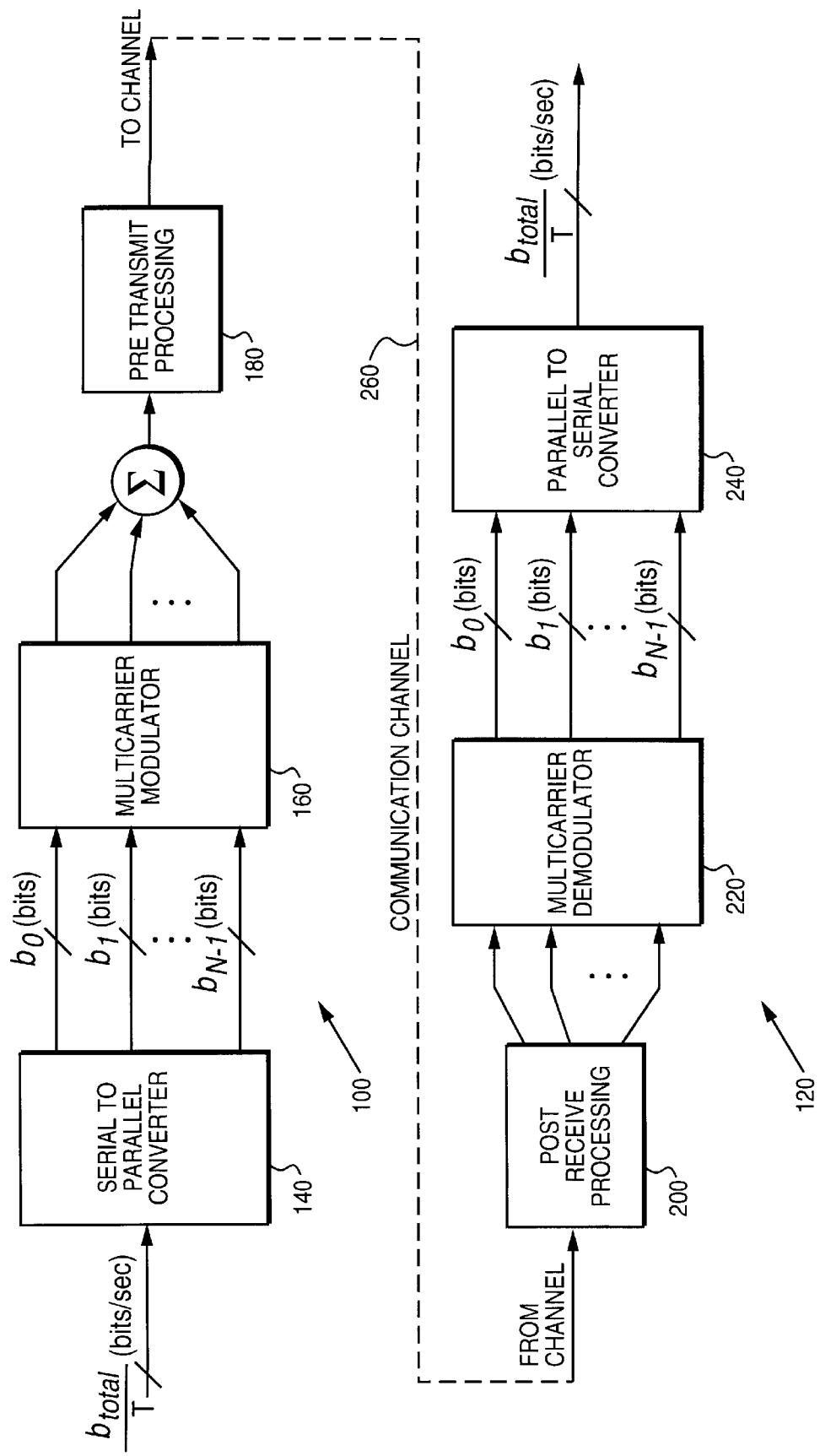
FIG. 5 is a block diagram illustrating a basic multi-carrier transmitter, communication channel, and receiver using the IDFT and the DFT as modulator and demodulator, respectively.

FIG. 5 shows an example Discrete Multitone (DMT) communication system in which the present invention may be advantageously employed. Transmitter 100 includes a serial-to-parallel converter 140, a multicarrier IDFT modulator 160, and a pretransmit processor 180. Receiver 120 includes a post channel processor 200, a multicarrier DFT demodulator 220, and a parallel-to-serial converter 240. The transmitter and receiver are linked in this example by a digital subscriber line (DSL) or other form of communication channel 260. Serial input data at a rate of $b_{total}/T$ bits per second are grouped by converter 140 into blocks of $b_{total}/T$ each multicarrier symbol, with a symbol period of T. The $b_{total}$ in each multicarrier symbol are used to modulate N separate carriers in modulator 160 with $b_i$ bits modulating the $i^{-th}$ carrier.

Figure 6:
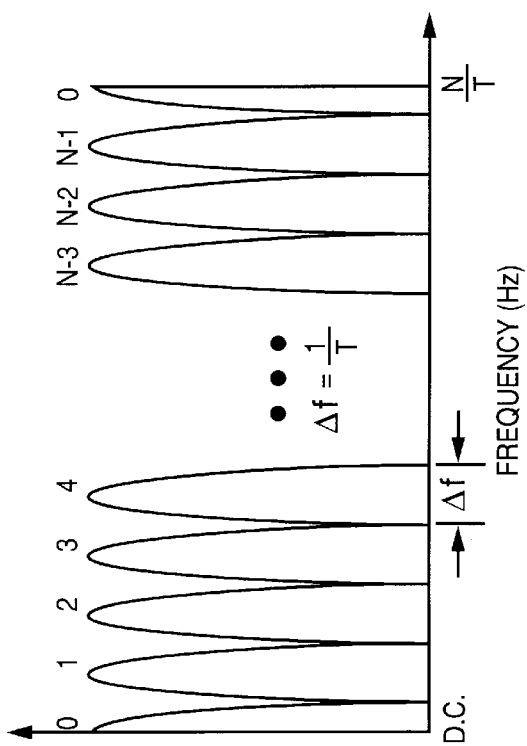
FIG. 6 is a diagram conceptually illustrating frequency domain discrete multi-tone modulation (DMT)

An Inverse Discrete Fourier Transform (IDFT) is used during modulation to generate $N_s$ time-domain samples of a transmit signal for each block of $b_{total}$ bits, where $N_s$ is preferably equal to 2N. The corresponding multicarrier demodulator performs a Discrete Fourier Transform (DFT), where $b_i$ bits are recovered from the $i^{-th}$ carrier. As depicted in FIG. 6, the carriers or subchannels in a DMT system are spaced 1/T Hz apart across N/T Hz of the frequency band. More detailed discussion of the principles of multicarrier transmission and reception in general is given by J. A. C. Bingham in "Multicarrier Modulation for Data Transmission: An Idea Whose Time Has Come", IEEE Communications Magazine, Volume 28, Number 5, pp. 5–14, May 1990.

Figure 7:
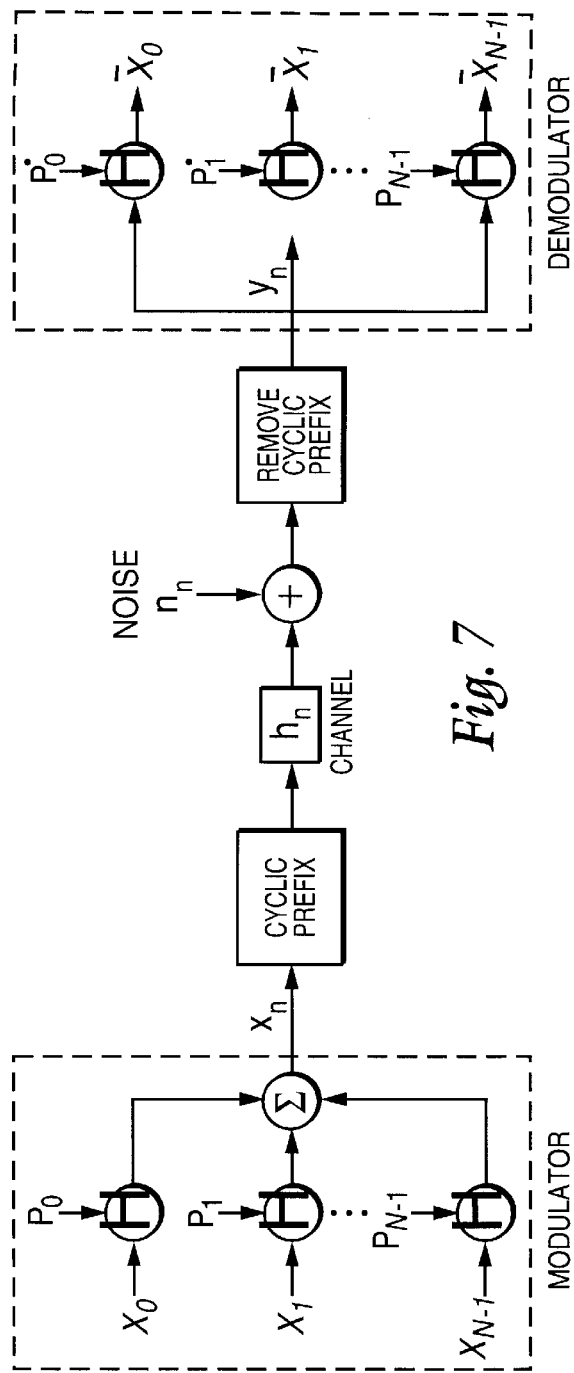
FIG. 7 is a diagram schematically depicting the basic structure of a discrete multi-tone modulation system.

The general structure of a Discrete Multitone Modulation DMT system is illustrated in FIG. 7, where $\{X_0, X_1, \ldots, X_{N-1}\}$ are the original, complex, input data symbols, $\{x_n\}$ is the modulated data sequence (before cyclic prefix), $\{h_n\}$ is the discrete-time channel response, $\{n_n\}$ is the additive noise sequence, $\{y_n\}$ is the received sequence (after the removal of cyclic prefix), and $\{\tilde{X}_1, \ldots, \tilde{X}_{N-1}\}$ are the decoded, complex data symbols. The $p_i$'s and $p_1^*$'s in FIG. 7 are known as the modulating and the demodulating vectors, and preferably they are chosen to be orthonormal. Adding the cyclic prefix is a discrete-time technique used to eliminate interblock interference (IBI) in the DMT system. The independent modulating and demodulating vectors in FIG. 7 used in the modulator 160 and demodulator 220 in FIG. 5, respectively, are the IDFT and the DFT vectors given by the of relationships in equations (1) and (2) above.

2. The Zipper Protocol

In a typical, full duplex DMT transmission, one of two schemes are used for the duplexing. Either all subcarriers are used to send information in each direction at different times, known as time division duplexing (TDD), or different subcarriers send information in different directions at the same time, known as frequency division duplexing (FDD). However, there are advantages to assigning certain subcarriers to the upstream direction and the remaining subcarriers to the downstream direction of the full duplex communication. One preferred way to split the bandwidth in such a scenario is to divide it into two equal halves with the even subcarriers being used in one direction and the odd subcarriers being used in another direction. This particular subcarrier allocation lends itself well to the present invention in which efficiencies are gained by performing the IDFT on only even components and the DFT only on odd components, or the IDFT on only odd components and the DFT only on even components.

With the sub-carriers configured in this fashion, the Hermite symmetry and mirror symmetry algorithms detailed above may be directly applied to efficiently perform DFT/IDFT calculations in the demodulator and modulator, respectively. Since the sequence is real, it is Hermite symmetric which means that only one-half of the components contain information. Therefore, the IDFT of the even components may be efficiently computed using the Hermite symmetry embodiment. The IDFT of odd components may be efficiently computed using the mirror symmetry embodiment. The DFT of the even components is straightforwardly handled, and the DFT of odd components is efficiently computed using the mirror symmetry embodiment of the present invention.

In the description of the mirror symmetric embodiment in the preceding section, the presentation highlights the problem of computing a Fourier transform of a mirror symmetric complex sequence from which a real sequence is obtained. But there are advantages of applying the present invention going the other direction, i.e., from real to complex.

In the example application of the Zipper protocol, a mirror symmetric series may be created by choosing only odd spectral components corresponding to odd DMT subcarriers 1, 3, 5, 7, . . . , etc. which are complex. Yet when the transmitted, modulated sub-carriers are received, they are received as real signals. The problem therefore is how to effectively evaluate only that data on the odd carriers and discard the other data if we know that the data originally transmitted on the odd carriers is complex and mirror symmetric More generally, the problem is how to effectively compute complex, mirror symmetric sequences from a received real sequence.

Helpful towards solving the problem is an observation that half of the components of the received real sequence are simply the complex-conjugates of the other half, and therefore do not contain any new information. In other words, if we Fourier transform the lower part of the spectra of the sequence, the upper part of the spectra of the sequence can be reconstructed by simply reversing the indexing and then complex-conjugating the result. No complex multiplications or additions are required to accomplish the index reversing and complex-conjugating operations. Accordingly, if we remove the even components from the spectra (making the sequence half as long) and then compute the Fourier transform of only half of the remaining sequence (i.e., the odd components), the size of the Fourier transform is ultimately reduced four times from N to N/4. This means that the number of arithmetic operations are reduced roughly by a factor of 4 for this stage.

If the remaining N/4-point sequence is split into two N/8-point sequences in such a way that only trivial operations are needed to reconstruct the N/4-point sequence, the number of complex multiplications is reduced even more as follows:

$$2 \cdot \frac{N}{16} \log_2\left(\frac{N}{8}\right) = \frac{N}{8} \log_2\left(\frac{N}{8}\right) < \frac{N}{8} \log_2\left(\frac{N}{4}\right)$$

complex multiplications and $$2\left(2 \cdot \frac{N}{8} + \frac{N}{8}\log_2\left(\frac{N}{8}\right) + \frac{N}{8}\right) = \frac{N}{4} \cdot \log_2 N$$

additions. The issue is then how to manipulate the N-point, received real sequence to get two N/8-point sequences that will be further processed.

It was discovered after quite exhaustive algebraic manipulation (not repeated here) that choosing the two N/8-point sequences "g" and "h" set forth below fulfills the requirement of splitting the N-point real sequence into two N/8-point sequences with only trivial operations required to reconstruct the N/4-point sequence:

$$g = \left[x_{2m} - x_{2m+\frac{N}{2}} - j\left(x_{2m+\frac{N}{4}} - x_{2m+\frac{3}{4}N}\right)\right] \quad (36)$$

$$h = \left[x_{2m+1} - x_{2m+1+\frac{N}{2}} - j\left(x_{2m+1+\frac{N}{4}} - x_{2m+1+\frac{3}{4}N}\right)\right] \cdot W_{N/2}^m \quad (37)$$

Performing a DFT on each of the series g and h, we obtain their respective Fourier transforms G and H. It may be demonstrated that for an index k=0, . . . , N/8−1, the DMT sub-carriers numbered as 4k +1 (i.e., 1, 5, 9, . . . , N/2−3) may be obtained as follows:

$$X_{4k+1} = G_k + W_N^{4k+1} \cdot H_k = G_k + \tilde{H}_k \quad (38)$$

The subcarriers with indexes 4k+3 (i.e., 3, 7, 11, . . . , N/2−1) may be obtained as follows:

$$X_{4k+3} = G^*_{\frac{N}{8}-1-k} - \tilde{H}^*_{\frac{N}{8}-1-k} \quad (39)$$

Consequently, this means we can assemble the half of the spectrum consisting of odd components. But as set forth at the beginning of this discussion, the upper part of the spectrum is only the complex-conjugate of the lower part of the spectrum because of the mirror symmetry, and therefore, the other half spectrum is easily determined by the symmetry relationship to satisfy with about one-fourth the number of operations.

3. Other Example Applications

In the DMT Zipper application, the full duplex communications were assumed to be symmetric—substantially equal amounts of traffic flowing in both directions of the full duplex communication. However, the present invention may also be applied to asymmetric communications where a disproportionately large amount of information flows on one path while only a relatively small amount of information is conveyed along the other path, e.g., video-on-demand, file transfer in response to a user request, etc. For example, only DMT subcarriers 0, 4, 8, . . . , or 0, 8, 16, . . . might be assigned to the low traffic direction with the remaining subcarriers being assigned to the other heavier traffic direction. The Hermite symmetry and mirror symmetry embodiments may also be applied to this situation, with the length of the IDFT or DFT being modified to accommodate the ratio of carriers between the two directions. In the two DMT sub-carrier allocation examples just provided, the most appropriate length of the DFT/IDFT would be N/4, i.e., ¼ in one duplex path and ¾ in the other duplex path, because this leads to trivial twiddle factors in equations (31) and (33). If the sequence is split more than four times, the twiddle factor multiplications are no longer simply trivial.

Indeed, the present invention may be applied in any context where the DFT and IDFT have to be calculated. Consider for example two-dimensional data arrays stored in memory oftentimes used in Divide-and-Conquer algorithms used in FFT/IFFT algorithms. If each row of data in the array is identified as being either Hermite symmetric or mirror-symmetric, the present invention can be used to efficiently calculate the FFT/IFFT of those rows using the Hermite symmetry and mirror symmetry embodiments described above.

While the invention has been described in connection with practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for efficiently transforming an original input data sequence, comprising the steps of:

identifying a pattern in the original input data sequence from a set of plural patterns;

modifying the original input data sequence based on the identified pattern to reduce the number of samples in the original data sequence;

calculating a discrete Fourier transform (DFT) on the modified input data sequence to generate a transformed data sequence;

manipulating the transformed data sequence to generate an output sequence corresponding to the DFT of the original input data sequence.

2. The method in claim 1, further comprising:
determining an inverse discrete Fourier transform (IDFT) using the DFT rather than calculating the IDFT.

3. The method in claim 2, wherein the determining step includes:
complex-conjugating a sequence of data for which the IDFT is to be determined;
determining the DFT of the complex-conjugated data sequence; and
complex-conjugating the resulting sequence.

4. The method in claim 2, wherein the same mechanism used to calculate the DFT is used to determine the IDFT.

5. The method in claim 1, wherein the pattern identifies a redundancy in the original input data sequence.

6. The method in claim 1, wherein the identified pattern is a symmetry in the original input data sequence.

7. The method in claim 6, wherein the original input data sequence is Hermite symmetric.

8. The method in claim 6, wherein the original input data sequence includes two sub-sequences that are index-reversed conjugate symmetric sequences.

9. The method in claim 6, wherein the original input data sequence is mirror symmetric.

10. The method in claim 1, wherein the modified input data sequence is substantially one half of the length of the original data sequence.

11. The method in claim 1, wherein the modified input data sequence is substantially one fourth of the length of the original data sequence.

12. The method in claim 1, wherein the number of complex multiplications required to perform the calculating step is less than a number of complex multiplications required to calculate a DFT of the original input data sequence.

13. The method in claim 1, wherein the original input data sequence is real valued.

14. A method for efficiently transforming an original input data sequence, comprising the steps of:
identifying a pattern in the original input data sequence from a set of plural patterns;
modifying the original input data sequence based on the identified pattern to reduce the number of samples in the original data sequence;
calculating an inverse discrete Fourier transform (IDFT) on the modified input data sequence to generate a transformed data sequence;
manipulating the transformed data sequence to generate an output sequence corresponding to the IDFT of the original input data sequence.

15. The method in claim 14, further comprising:
determining a discrete Fourier transform (DFT) using the IDFT rather than calculating the DFT.

16. The method in claim 15, wherein the determining step includes:
complex-conjugating a sequence of data for which the DFT is to be determined;
determining the IDFT of the complex-conjugated data sequence; and
complex-conjugating the resulting sequence.

17. The method in claim 15, wherein the same mechanism used to calculate the IDFT is used to determine the DFT.

18. The method in claim 14, wherein the pattern identifies a redundancy in the original input data sequence.

19. The method in claim 14, wherein the pattern is a symmetry in the original input data sequence.

20. The method in claim 19, wherein the original input data sequence is Hermite symmetric.

21. The method in claim 19, wherein the original input data sequence includes two sub-sequences that are index-reversed conjugate symmetric sequences.

22. The method in claim 19, wherein the original input data sequence is mirror symmetric.

23. The method in claim 14, wherein the modified input data sequence is substantially one half of the length of the input data sequence.

24. The method in claim 14, wherein the modified input data sequence is substantially one fourth of the length of the input data sequence.

25. The method in claim 14, wherein a number of complex multiplications required to perform the executing step is less than a number of complex multiplications required to calculate an IDFT of the original input data sequence.

26. A method, comprising the steps of:
establishing an original, N-point Hermite symmetric input data sequence;
defining an N/2 sequence of complex numbers; and
executing a discrete Fourier transform (DFT) or an inverse discrete Fourier transform (IDFT) on the N/2 sequence of complex numbers to generate a transformed data sequence.

27. The method in claim 26, further comprising the steps of:
outputting the real part of the transformed sequence as the even numbered samples of an output sequence corresponding to the DFT or the IDFT of the original, N-point, Hermite symmetric input data sequence, and
outputting the imaginary part of the transformed sequence as the odd numbered samples of an output sequence corresponding to the DFT or the IDFT of the original, N-point, Hermite symmetric input data sequence.

28. A method comprising the steps of:
defining a first input data sequence and a second input data sequence from an original input data sequence depending on a pattern identified in the original input data sequence;
executing a discrete Fourier transform (DFT) or an inverse discrete Fourier transform (IDFT) on the first input data sequence to generate a transformed data sequence; and
determining a DFT or IDFT of the second input data sequence using the DFT or IDFT of the first input data sequence.

29. The method in claim 28, wherein the DFT or IDFT of the second input data sequence is determined without calculating the DFT or IDFT of the second input data sequence.

30. The method in claim 28, wherein the first and second sequences are index-reversed complex-conjugate sequences.

31. The method in claim 28, wherein the DFT of the second input data sequence is determined by complex-conjugating the DFT of the first input data sequence and multiplying by a complex number.

32. The method in claim 28, wherein the IDFT of the second input data sequence is determined by complex-conjugating the IDFT of the first input data sequence and multiplying by a complex number.

33. A method comprising the steps of:
establishing a mirror symmetric sequence;
forming a subsequence containing the even components of the mirror symmetric sequence;
calculating a discrete Fourier transform (DFT) or an inverse discrete Fourier transform (IDFT) on the subsequence; and determining the DFT or the IDFT of the mirror symmetric sequence using the calculated DFT or the IDFT of the subsequence and the DFT or the IDFT of a complex-conjugate of the calculated DFT or IDFT.

34. The method in claim 33, wherein the determining step includes:

calculating a first half of the DFT or IDFT of the mirror symmetric sequence using the calculated DFT or IDFT summed with a product of a twiddle factor and the complex-conjugate of the calculated DFT or IDFT.

35. The method in claim 34, wherein the determining step includes:

calculating a second half of the DFT or IDFT of the mirror symmetric sequence using the calculated DFT or IDFT differenced with a product of the twiddle factor and the complex-conjugate of the calculated DFT or IDFT.

36. A transceiver for transmitting and receiving signals, where one information sequence to be transmitted is modulated onto discrete multi-tone (DMT) carriers using an inverse fast Fourier transform (IFFT) and another information sequence is demodulated from received DMT carriers using a fast Fourier transform (FFT), comprising:

a pre-transform processor modifying an original data sequence depending on a pattern identified in the original data sequence to reduce the size of the fast Fourier transform to be calculated, and transform circuitry performing an IFFT on the modified data sequence to modulate DMT carriers to be transmitted by the transceiver in a transmit direction and a FFT to demodulate DMT carriers received by the transceiver in a receive direction, the transform circuitry including a transform processor that manipulates the transformed data sequence to generate an output sequence corresponding to the FFT or the IFFT of the original data sequence.

37. The transceiver in claim 36, wherein the DMT carriers in the transmit direction include even number DMT carriers and the DMT carriers in the receive direction include odd number DMT carriers or vice versa.

38. The transceiver in claim 36, wherein the number of DMT carriers in the transmit direction is substantially the same as the number of DMT carriers in the receive direction.

39. The transceiver in claim 36, wherein the number of DMT carriers in the transmit direction is substantially different than the number of DMT carriers in the receive direction.

40. The transceiver in claim 36, wherein the identified pattern identifies a redundancy in the original input data sequence.

41. The transceiver in claim 36, wherein the identified pattern is a symmetry in the original input data sequence.

42. The transceiver in claim 41, wherein the original input data sequence is Hermite symmetric.

43. The transceiver in claim 41, wherein the original input data sequence includes two sub-sequences that are index-reversed conjugate symmetric sequences.

44. The transceiver in claim 41, wherein the original input data sequence is mirror symmetric.

* * * * *